US010676972B2

(12) United States Patent
Preuss et al.

(10) Patent No.: US 10,676,972 B2
(45) Date of Patent: Jun. 9, 2020

(54) LATCH INSERT AND SPACERS FOR SLIDER WINDOW ASSEMBLY

(71) Applicant: Taylor Made Group, LLC, Gloversville, NY (US)

(72) Inventors: Mark Preuss, Angola, IN (US); Andrew Knepper, Fort Wayne, IN (US)

(73) Assignee: TAYLOR MADE GROUP, LLC, Gloversville, NY (US)

(*) Notice: Subject to any disclaimer, the term of this patent is extended or adjusted under 35 U.S.C. 154(b) by 48 days.

(21) Appl. No.: 15/906,027

(22) Filed: Feb. 27, 2018

(65) Prior Publication Data

US 2019/0264478 A1 Aug. 29, 2019

(51) Int. Cl.
| E05B 65/04 | (2006.01) |
| E05C 17/48 | (2006.01) |
| E06B 3/46 | (2006.01) |
| E05C 1/00 | (2006.01) |
| E05C 1/06 | (2006.01) |
| E05D 15/06 | (2006.01) |
| E05C 17/62 | (2006.01) |

(52) U.S. Cl.
CPC .............. *E05C 17/48* (2013.01); *E05C 1/004* (2013.01); *E05C 1/06* (2013.01); *E05C 17/62* (2013.01); *E05D 15/06* (2013.01); *E06B 3/4609* (2013.01); *E05Y 2600/45* (2013.01); *E05Y 2800/176* (2013.01); *E05Y 2900/55* (2013.01)

(58) Field of Classification Search
CPC .......... E05C 17/48; E05C 17/62; E05C 1/004; E05C 1/06; E06B 3/4654; E05D 15/06; E05Y 2600/45; E05Y 2900/55

USPC ...................................................... 49/63, 450
See application file for complete search history.

(56) References Cited

U.S. PATENT DOCUMENTS

| 1,384,904 | A | * | 7/1921 | Lattimore | .................. B60J 1/16 |
| | | | | | 16/90 |
| 1,516,995 | A | * | 11/1924 | Trigueiro | ............ E05B 65/0864 |
| | | | | | 292/175 |
| 2,081,745 | A | * | 5/1937 | Hohmann | .................. B60J 1/14 |
| | | | | | 49/144 |
| 3,085,300 | A | * | 4/1963 | Carlston | ................. E05D 13/04 |
| | | | | | 292/150 |
| 3,976,317 | A | | 8/1976 | Collier | |
| 3,997,200 | A | | 12/1976 | Brown | |
| 4,190,271 | A | * | 2/1980 | Hawkins | ............. E05B 65/0894 |
| | | | | | 292/145 |
| 4,202,136 | A | | 5/1980 | Riegelman | |
| 4,227,725 | A | * | 10/1980 | Lindquist | ................ E05D 13/04 |
| | | | | | 292/202 |
| 4,314,719 | A | * | 2/1982 | Hawkins | ............. E05B 65/0894 |
| | | | | | 292/145 |

(Continued)

*Primary Examiner* — Jerry E Redman
(74) *Attorney, Agent, or Firm* — Nixon & Vanderhye P.C.

(57) ABSTRACT

A trim assembly securable in a window frame includes a track on which a sliding window is supportable, a latch insert including a plurality of latch openings, and a latch mechanism securable to the sliding window adjacent the latch insert. The latch mechanism is displaceable between an extended position and a retracted position and includes a lever connected with a latch tab. In the extended position, the latch tab is positioned in a selected one of the latch openings. The latch mechanism is biased toward the extended position. The spacing of the latch openings provides for essentially infinite open/close positions.

14 Claims, 4 Drawing Sheets

(56) References Cited

U.S. PATENT DOCUMENTS

| | | | |
|---|---|---|---|
| 4,502,248 A | 3/1985 | Thomas, Jr. et al. | |
| 4,571,888 A * | 2/1986 | Jensen | E05C 17/60 |
| | | | 49/374 |
| 5,074,133 A | 12/1991 | Simoncelli | |
| 5,140,769 A | 8/1992 | Hickson et al. | |
| 5,174,617 A | 12/1992 | Huber et al. | |
| 5,799,444 A | 9/1998 | Freimark et al. | |
| 5,996,284 A | 12/1999 | Freimark et al. | |
| 6,014,840 A | 1/2000 | Ray et al. | |
| 7,017,304 B2 * | 3/2006 | Bourque | B60J 3/0204 |
| | | | 292/204 |
| 7,036,851 B2 | 5/2006 | Romig | |
| 7,155,862 B2 * | 1/2007 | Bourque | B60J 1/1853 |
| | | | 49/209 |
| 7,322,619 B2 | 1/2008 | Nolte et al. | |
| 7,963,577 B2 | 6/2011 | Wolf | |
| 8,091,955 B2 | 1/2012 | Hill et al. | |
| 8,769,872 B2 * | 7/2014 | Maltaverne | B60J 1/16 |
| | | | 49/209 |
| 9,890,570 B2 | 2/2018 | Horwood | |
| 2009/0025296 A1 * | 1/2009 | Petner | E05F 15/652 |
| | | | 49/130 |
| 2011/0006558 A1 * | 1/2011 | Giret | B60J 1/16 |
| | | | 296/146.15 |

* cited by examiner

LATCH INSERT AND SPACERS FOR SLIDER WINDOW ASSEMBLY

CROSS-REFERENCES TO RELATED APPLICATIONS (Not Applicable)

STATEMENT REGARDING FEDERALLY SPONSORED RESEARCH OR DEVELOPMENT (Not Applicable)

BACKGROUND

The invention relates to a sliding window assembly and, more particularly, to a sliding window assembly with an infinite position latch insert and top positioned spacers for preventing jams during opening and closing of the sliding window.

Existing sliding window assemblies typically include discrete limited latch positions such that the sliding window is latched at either a fully open position or a fully closed position with possibly a few interim latch positions. Additionally, depending on the position of the latch mechanism and the size of the window, it is not uncommon for a sliding window to rotate slightly during opening and closing of the window, which can cause the window to jam.

It would thus be desirable to provide a window assembly including a latch mechanism with infinite open/close positions. Additionally, it would be desirable to prevent the window from rotating during opening/closing to avoid the window becoming jammed.

BRIEF SUMMARY

A trim member is securable in a window frame and includes a track on which a sliding window is supportable. In some embodiments, the trim member includes openings for receiving one or more latch inserts that are cooperable with a latch mechanism secured to the window. A spacer may also be provided to prevent the window from rotating and thereby prevent a jam in the track.

In an exemplary embodiment, a window assembly includes a trim member with a track and securable in a window frame, a latch insert connected to the trim member and including a plurality of latch openings, a sliding window coupled with the trim member and mounted for slidable displacement on the track, and a latch mechanism secured to the sliding window adjacent the latch insert. The latch mechanism is displaceable between an extended position and a retracted position and includes a lever connected with a latch tab. In the extended position, the latch tab is positioned in a selected one of the latch openings, and the latch mechanism is biased toward the extended position.

The trim member may include at least one latch insert opening, and the latch insert may include a connecting member on an underside thereof that is disposed in the latch insert opening. The connecting member may include an integral connector tab and at least one integral spring latch, where the latch insert may be connected to the latch insert opening in a snap fit via the integral spring latch. The trim member may include a plurality of latch insert openings along a length thereof, and the window assembly may include a corresponding plurality of latch inserts secured end to end in the latch insert openings.

The latch openings may be spaced less than 0.5″ apart. In some embodiments, the trim member may include a second track.

In another exemplary embodiment, a trim assembly securable in a window frame includes a track on which a sliding window is supportable, a latch insert including a plurality of latch openings, and a latch mechanism securable to the sliding window adjacent the latch insert and displaceable between the extended position and the retracted position. The latch mechanism similarly includes a lever connected with a latch tab, and in the extended position, the latch tab is positioned in a selected one of the latch openings. As above, the latch mechanism is biased toward the extended position.

BRIEF DESCRIPTION OF THE DRAWINGS

These and other aspects and advantages will be described in detail with reference to the accompanying drawings, in which.

DETAILED DESCRIPTION

The window/trim assembly of the described embodiments is shown with an exemplary application to a dual slider window. Those of ordinary skill in the art will appreciate alternative applications of the described assembly, and the invention is not meant to be limited to the illustrated example.

Figure 1:
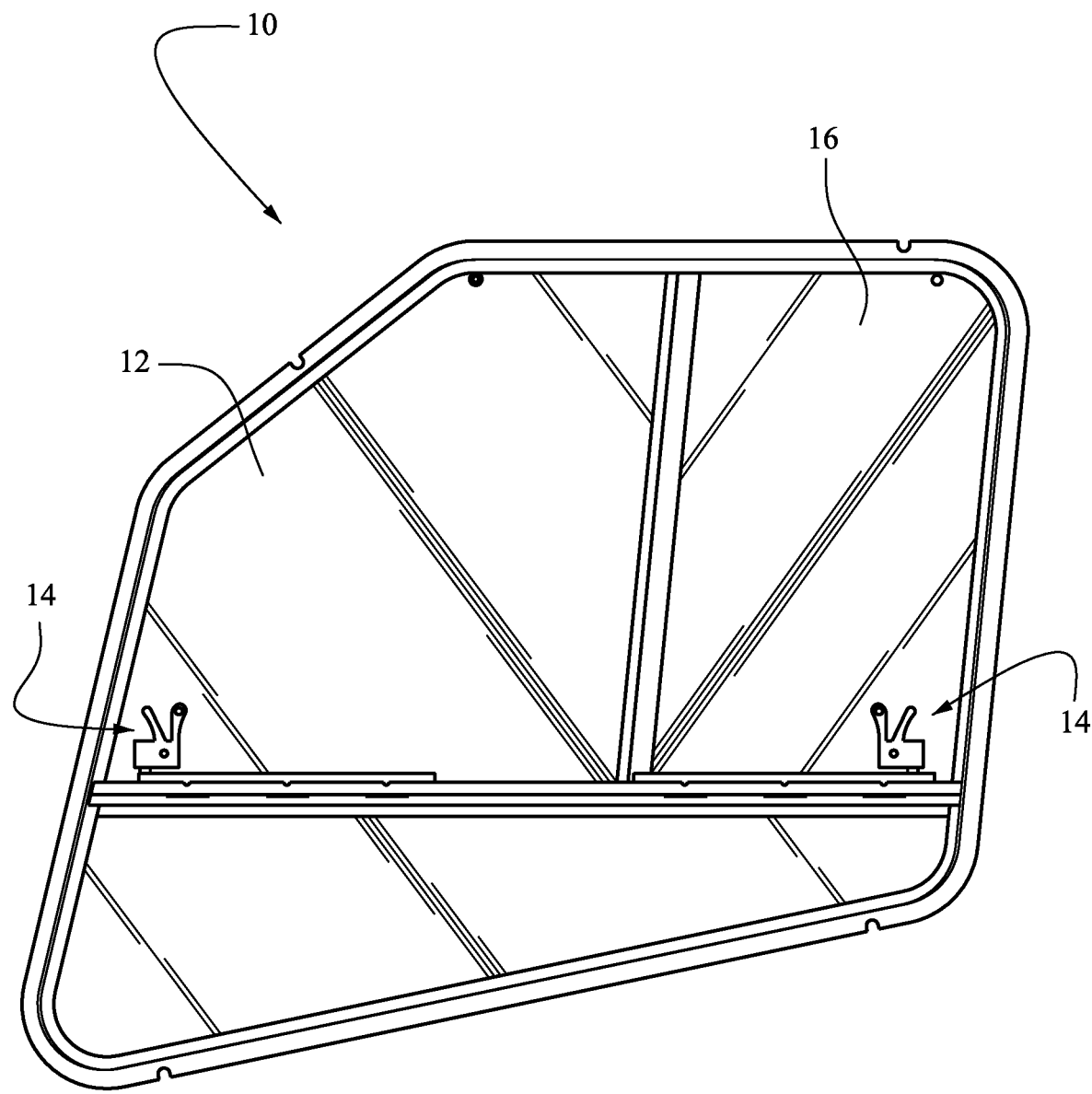
FIG. 1 shows an exemplary dual slider window.
Figure 2:
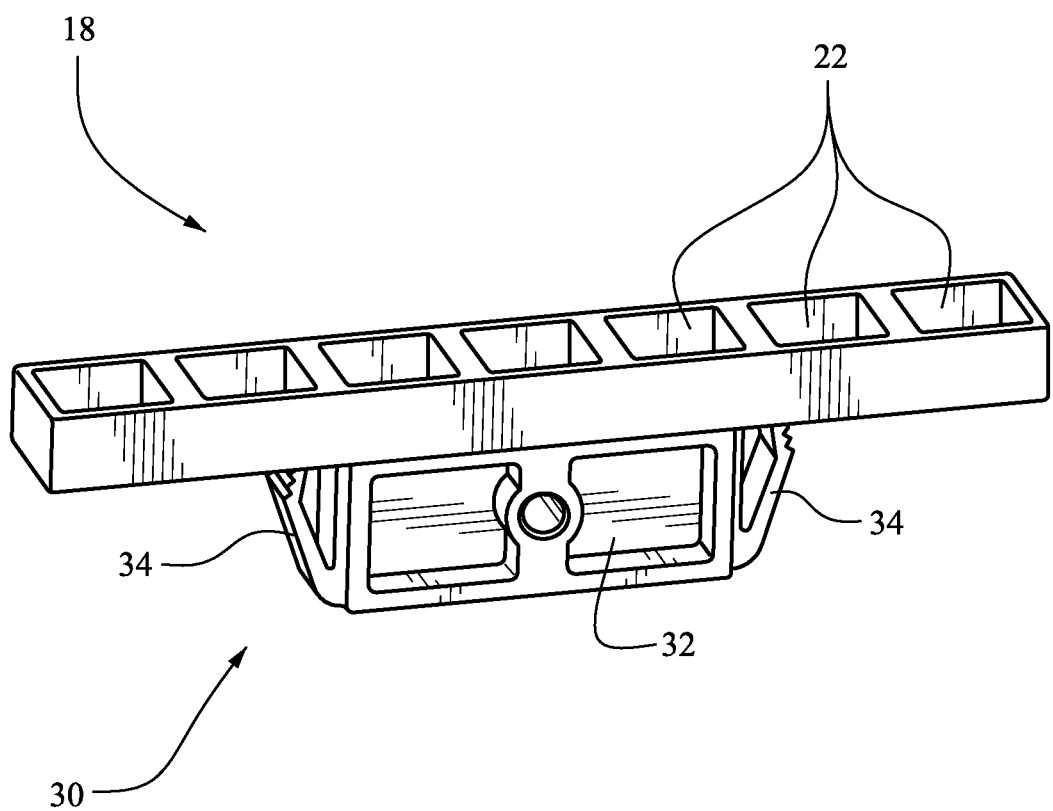
FIG. 2 is a perspective view of a latch insert.
Figure 3:
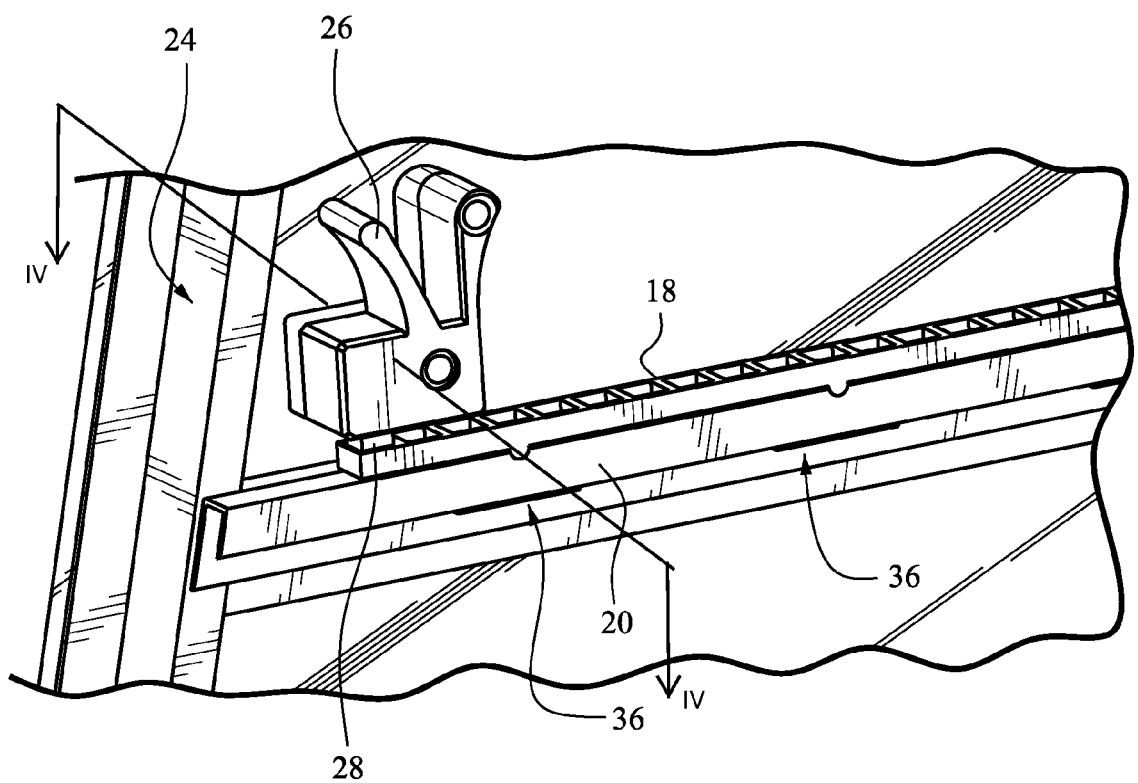
FIG. 3 shows the assembled trim member.
Figure 4:
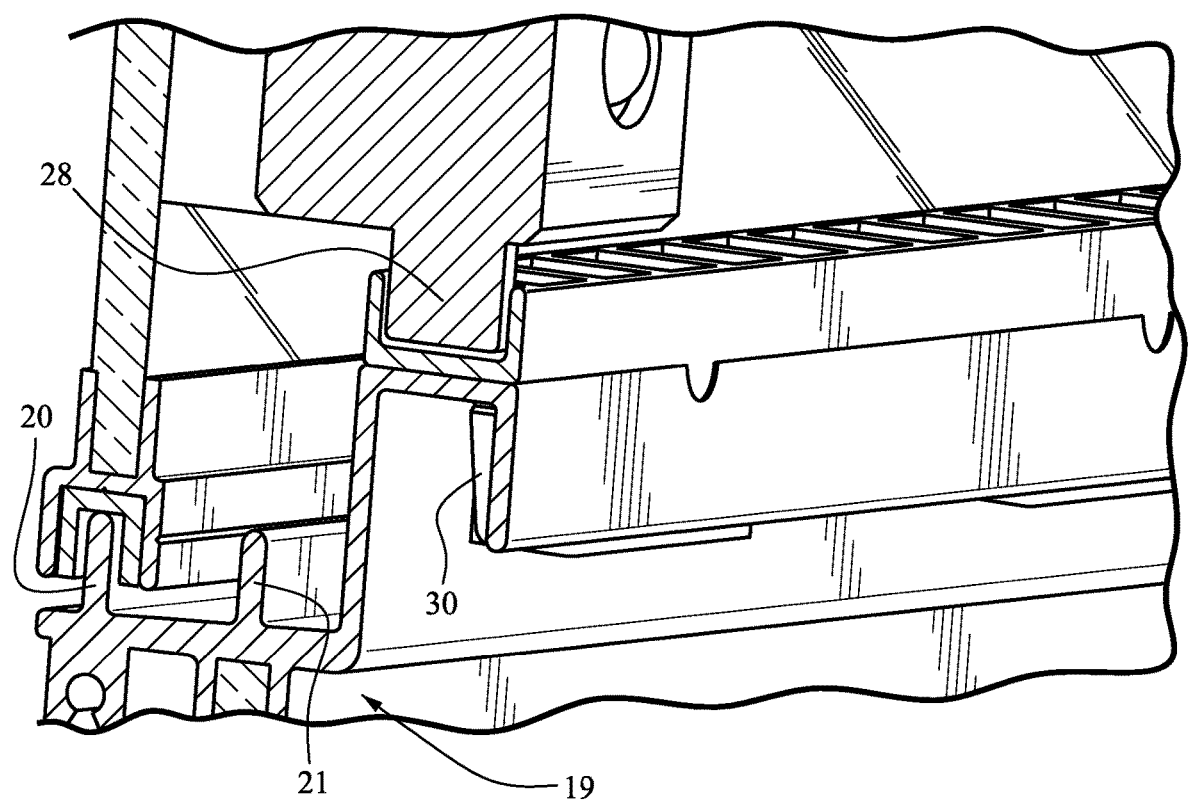
FIG. 4 is a sectional perspective view of the window assembly through IV-IV in FIG. 3.

FIG. 1 shows a dual slider window 10 including a first sliding window 12 with a latch mechanism 14 and a second sliding window 16 with a latch mechanism 14. With reference to FIGS. 2-4, the latch mechanism includes a latch insert 18 that is cooperable with a trim member 19 including a track 20 on which the sliding window 12 is slidably mounted. In some embodiments, the trim member 19 includes a second track 21 for the second sliding window 16. The latch 18 includes a plurality of latch openings 22 on an upward facing surface. The openings 22 are spaced in small increments such that the sliding windows are essentially infinitely adjustable. That is, even though the opening is technically incrementally adjustable in each of the openings 22, because the openings 22 are spaced in very small increments, the opening position of the sliding windows 12, 16 is essentially infinitely adjustable. For example, the openings may be spaced less than 0.5 inches apart, or less than 0.25 inches apart, or less than 0.1 inches apart. In a preferred construction, the openings are spaced about 0.25 inches apart.

The latch mechanism 24 is conventional and includes a lever 26 that selectively retracts a latch tab 28. The lever 26 and latch tab 28 are typically biased toward an extended or locked position by a spring or the like where the latch tab 28 is disposed in one of the openings 22 in the latch insert 18. In this configuration, the sliding windows 12, 16 are locked in position. When the lever 26 is displaced to retract the latch tab 28 from the openings 22, the windows 12, 16 are freely slidable on the track 20.

With reference to FIG. 2, the latch insert 18 includes a connecting member 30 on an underside thereof. The connecting member 30 may be configured in any suitable manner to secure the latch insert 18 to the track 20. In an exemplary construction, the connector 30 includes a connector tab 32 surrounded on at least one lateral side thereof, preferably two opposite lateral sides as shown, with spring latches 34. The spring latches 34 may be connected via a living hinge or the like. The tab 32 and spring latches 34 are sized to fit in corresponding openings 36 formed in the track 20. The latch inserts 18 are secured in the track 20 by inserting the tab 32 and spring latches 34 through the openings 36 in the track until the spring latches 34 snap lock in place. That is, the spring latches 34 may include a shoulder adjacent top ends thereof such that as the latch insert 18 is pressed into the opening 36, the sides of the opening 36 deflect the spring latches inward. Once the latch insert 18 is pressed into the opening 36 to the shoulders, the spring latches 34 snap outward to engage the opening 36.

Preferably, the trim member 19 and track 20 are extruded, and the openings 36 are machined in the extruded member. The number of openings 36 is dependent on the width and sliding range of the window. That is, the latch inserts 18 can be secured end-to-end along the track 20 in several openings 36 so that a large sliding window can be accommodated.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A window assembly comprising:
   a trim member securable in a window frame, the trim member including a track;
   a latch insert connected to the trim member and including a plurality of latch openings;
   a sliding window coupled with the trim member and mounted for slidable displacement on the track; and
   a latch mechanism secured to the sliding window adjacent the latch insert, the latch mechanism being displaceable between an extended position and a retracted position and including a lever connected with a latch tab, wherein in the extended position, the latch tab is positioned in a selected one of the latch openings, and wherein the latch mechanism is biased toward the extended position,
   wherein the trim member comprises at least one latch insert opening, wherein the latch insert comprises a connecting member on an underside thereof that is disposed in the latch insert opening, and wherein the connecting member comprises a connector tab and at least one spring latch, the latch insert being connected to the latch insert opening in a snap fit via the spring latch.

2. A window assembly according to claim 1, wherein the connector tab is an integral connector tab, and wherein the at least one spring latch is an integral spring latch.

3. A window assembly according to claim 2, wherein the trim member comprises a plurality of latch insert openings along a length thereof, and wherein the window assembly comprises a corresponding plurality of latch inserts secured end to end in the latch insert openings.

4. A window assembly according to claim 1, wherein the trim member comprises a plurality of the latch insert openings along a length thereof, and wherein the window assembly comprises a corresponding plurality of the latch inserts secured end to end in the latch insert openings.

5. A window assembly according to claim 1, wherein the latch openings are spaced less than 0.5" apart.

6. A window assembly according to claim 1, wherein the trim member comprises a second track.

7. A trim assembly securable in a window frame, the trim assembly comprising:
   a track on which a sliding window is supportable, the track including a tab opening;
   a latch insert including a plurality of latch openings on one side thereof and a connector tab on an opposite side thereof, wherein the connector tab is engageable in the tab opening in a snap fit; and
   a latch mechanism securable to the sliding window adjacent the latch insert, the latch mechanism being displaceable between an extended position and a retracted position and including a lever connected with a latch tab, wherein in the extended position, the latch tab is positioned in a selected one of the latch openings, and wherein the latch mechanism is biased toward the extended position,
   wherein the connecting member comprises at least one spring latch, the latch insert being connected to the latch insert opening in the snap fit via the spring latch.

8. A trim assembly according to claim 7, wherein the connector tab is an integral connector tab, and wherein the at least one spring latch is an integral spring latch.

9. A trim assembly according to claim 8, comprising a plurality of latch insert openings along a length thereof and a corresponding plurality of latch inserts secured end to end in the latch insert openings.

10. A trim assembly according to claim 7, comprising a plurality of latch insert openings along a length thereof and a corresponding plurality of latch inserts secured end to end in the latch insert openings.

11. A trim assembly according to claim 7, further comprising a second track.

12. A window assembly comprising:
   a trim member securable in a window frame, the trim member including a track and a plurality of latch insert openings along a length thereof;
   a plurality of latch inserts connected end to end in the latch insert openings and including a plurality of latch openings, wherein each of the latch inserts comprises a connecting member on an underside thereof that is secured in a respective one of the latch insert openings, wherein the connecting member comprises an integral connector tab and at least one integral spring latch, the latch inserts being connected to respective ones of the latch insert openings in a snap fit via the integral spring latch;
   a sliding window coupled with the trim member and mounted for slidable displacement on the track; and
   a latch mechanism secured to the sliding window adjacent the latch inserts, the latch mechanism being displaceable between an extended position and a retracted position and including a lever connected with a latch tab, wherein in the extended position, the latch tab is positioned in a selected one of the latch openings, and wherein the latch mechanism is biased toward the extended position.

13. A window assembly according to claim 12, wherein the latch openings are spaced less than 0.5" apart.

14. A window assembly according to claim 12, wherein the trim member comprises a second track.

* * * * *